(12) United States Patent
Quinn et al.

(10) Patent No.: US 7,744,032 B2
(45) Date of Patent: Jun. 29, 2010

(54) POWER AND IMAGING SYSTEM FOR AN AIRSHIP

(75) Inventors: Edward W. Quinn, Uniontown, OH (US); Jeanette Hariharan, Akron, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 372 days.

(21) Appl. No.: 11/796,493

(22) Filed: Apr. 27, 2007

(65) Prior Publication Data

US 2008/0265087 A1 Oct. 30, 2008

(51) Int. Cl.
 *B64B 1/02* (2006.01)
(52) U.S. Cl. ......................................................... 244/30
(58) Field of Classification Search .................. 244/30; 343/705–706
 See application file for complete search history.

(56) References Cited

U.S. PATENT DOCUMENTS

| | | | | |
|---|---|---|---|---|
| 3,434,678 | A | * | 3/1969 | Heenan et al. ............ 244/158.1 |
| 5,043,739 | A | * | 8/1991 | Logan et al. ................. 343/701 |
| 5,068,669 | A | * | 11/1991 | Koert et al. ............ 343/700 MS |
| 5,218,374 | A | * | 6/1993 | Koert et al. .................. 343/789 |
| 5,400,037 | A | | 3/1995 | East ............................ 342/372 |
| 5,503,350 | A | * | 4/1996 | Foote ......................... 244/1 R |
| 5,890,676 | A | * | 4/1999 | Coleman et al. ............. 244/128 |
| 6,357,700 | B1 | | 3/2002 | Provitola ..................... 244/172 |
| 6,581,873 | B2 | | 6/2003 | McDermott ................... 244/25 |
| 6,792,259 | B1 | | 9/2004 | Parise ....................... 455/343.1 |
| 6,919,847 | B2 | * | 7/2005 | Caplan et al. ................ 343/705 |
| 6,954,177 | B2 | * | 10/2005 | Channabasappa et al. ... 343/700 MS |
| 6,979,479 | B2 | | 12/2005 | Lavan et al. ................... 428/1.1 |

FOREIGN PATENT DOCUMENTS

WO WO 95/12237 5/1995

OTHER PUBLICATIONS

*Tri-Band Frequency Selective Service with Circular Ring Elements*—Huang et al.—IEEE Transactions on Antennas and Propogation., vol. 42, No. 2, Feb. 1994; pp. 166-175.
*An Ultra-Lightweight High Gain Spacecraft Antenna*—Schneider et al.—IEEE Antennas Propagat. Int. Symp, Seattle, WA, Jun. 1994, pp. 886-889.
*A Microwave Powered High Altitude Platform*—IEEE MTT-S Int. Symp., Dig. 1988, pp. 283-286.
*Design Study for a Ground Microwave Power Transmission System for Use with a High-Altitude Powered Platform*—NASA final contractor report 168344,W.C. Brown, Raytheon Rpt. PT-6052, Jun. 1983.

* cited by examiner

*Primary Examiner*—Tien Dinh
(74) *Attorney, Agent, or Firm*—Renner Kenner Greive Bobak Taylor & Weber

(57) ABSTRACT

A power transmission and imaging system for an airship comprises a transmission antenna array configured to transmit an energy beam to a patch rectenna carried by the airship. Coupled to the patch rectenna is a power distribution and control network that supplies rectified power delivered by the energy beam into the proper format for delivery to a power storage system and a motor control system. The power storage system comprises one or more batteries to store the transmitted energy, while the motor control system powers various propellers, blowers, and valves maintained by the airship in order to descend the airship to the ground. The rectenna may also function as an imaging system in real-time. The image processing system uses the patch rectenna to transmit and receive signals, and in turn store and process the return signals (images).

18 Claims, 4 Drawing Sheets

POWER AND IMAGING SYSTEM FOR AN AIRSHIP

TECHNICAL FIELD

Generally, the present invention relates to a system for receiving power from a ground station by an airship. More specifically, the present invention relates to a system for receiving power from a ground station by an airship using a phased array antenna. Particularly, the present invention is directed to a system for receiving power by a patch rectenna array carried by an airship configured to receive an energy beam from a phased array antenna maintained by the ground station. More particularly, the present invention is directed to a dual use system that integrates a power transmission/reception function and a radar imaging function into an airship or other lighter than air platform.

BACKGROUND ART

Traditional airships, which may also referred to as blimps, aerostats, dirigibles, or lighter-than-air vehicles/platforms, comprise numerous components that are necessary for the navigational and operational needs of the airship. Specifically, as shown in FIG. 1, a typical prior art airship 10 comprises a gas impervious envelope 12 that is formed from a flexible laminate material or fabric that is made to withstand the pressure changes encountered by the airship 10 during ascent and descent, as well as, heat and solar radiation that are encountered during the airship's operation. An exemplary laminate material used by the airship 10 is disclosed in U.S. Pat. No. 6,979,479, which is incorporated herein by reference. Within the envelope 12 reside various discrete regions that separately contain helium and air, which allow the airship 10 to be effectively controlled during ascent and descent.

To allow the airship 10 to ascend to altitude, the air containing regions are exhausted through a number of valves 16 disposed about the perimeter of the airship 10. The helium within the envelope 12 expands while the airship 10 ascends to the desired altitude. It will be appreciated that expansion of the helium also forces air out of air containing regions through the blowers maintained by the airship. In order to descend the airship 10 from altitude, air is forced back into each air containing region by operation of one or more blowers 18. In order to maneuver or navigate the airship 10 while in flight or during ascent and descent, a propulsion system is utilized. The propulsion system typically comprises a plurality of electrically powered propeller units 20 mounted externally to the envelope 12 is utilized.

A significant amount of electrical power is required to operate the valves 16, blowers 18 and propeller units 20, and any other electrical component aboard the airship 10. Indeed, a significant amount of electrical power is required upon descent of the airship, as the buoyancy of the helium lifting gas is overcome.

Thus, to meet the energy demands required by the valves 16, blowers 18, and propeller units 20, numerous batteries, solar panels, and/or fuel cells have been used as power sources aboard the airship 10. While these systems are adequate from an energy capacity standpoint, complex and bulky power management systems are required to process the power delivered thereby. For example, approximately 4,000 lbs. of batteries may be needed to fully power the airship 10 during its descent from altitude. As such, the weight contributed by the batteries and other existing energy sources currently utilized by airships negatively impacts the maneuverability of the airship 10, its ability to attain desired altitudes and traveling ranges, as well as its overall performance.

In addition to the significant weight added to the airship 10 by the batteries, a substantial expense is also incurred to maintain, charge, and periodically replace failed batteries to ensure that the airship 10 has the optimal power capacity to complete a decent after a launch.

It will be appreciated that one of the main advantages of high-altitude airships is that they can carry monitoring equipment that can observe any surface or air activity underneath the airship. Accordingly, any monitoring device that is relatively lightweight and that can be carried by the airship provides an additional advantage to the airship.

Thus, there is a need for a power reception and imaging system for an airship that reduces the overall weight of the airship. In addition, there is a need for a power reception and imaging system that reduces the need for batteries, or other energy storage devices of finite capacity. Furthermore, there is a need for a power reception system and imaging system that receives continuous energy from a ground station to the airship, so as to power the airship during all phases of flight, including descent. Still yet, there is a need for a power reception and imaging system that provides a phased array antenna system that generates a focused energy beam for receipt by the airship. Further, there is a need for a power reception and imaging system that utilizes a nanofiber patch rectenna maintained by the airship to receive the transmitted energy beam. Additionally, there is a need for a power reception and imaging system that utilizes a lightweight matched filter, allowing the energy received from the patch rectenna to be efficiently retrieved from a transmitted energy beam. Furthermore, there is a need for a power transmission and imaging system that receives power at a frequency capable of passing through the envelope of the airship. In addition, there is a need for a power reception and imaging system that provides a ground station that generates and transmits a steered energy beam that is periodically realigned with the patch rectenna so as to ensure consistent alignment of the energy beam with the airship. Moreover, there is a need for a ground station used with a power reception and imaging system that utilizes a LADAR (laser detection and ranging) system or other efficient, narrow beam, high frequency transmission system to transmit an energy beam to the patch rectenna to power the airship during all phases of flight, including descent. Finally, there is a need for a dual-use system that integrates both energy reception functions with various imaging functions maintained by the airship.

SUMMARY OF INVENTION

In light of the foregoing, it is a first aspect of the present invention to provide a power and imaging system for an airship.

It is another aspect of the present invention to provide a power and imaging system for an airship, the system comprising an airship, a power transmission system configured to transmit an energy beam, a patch rectenna carried by the airship, wherein the energy beam is transmitted to the patch rectenna so as to supply power to the airship; and a power distribution and control network coupled to the patch rectenna such that when the energy beam is transmitted to the patch rectenna, the control network converts the energy beam into power for use by the airship.

Yet another aspect of the present invention is to provide a method for remotely powering an airship comprising transmitting an energy beam from a power transmission system, receiving the energy beam at a rectenna carried by the airship, determining if the voltage output by the rectenna is above or below a predetermined threshold level, transmitting a realignment feedback signal from the airship to the power transmission system if the voltage is below the predetermined threshold, analyzing the realignment feedback signal, and repainting the energy beam with respect to the rectenna.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
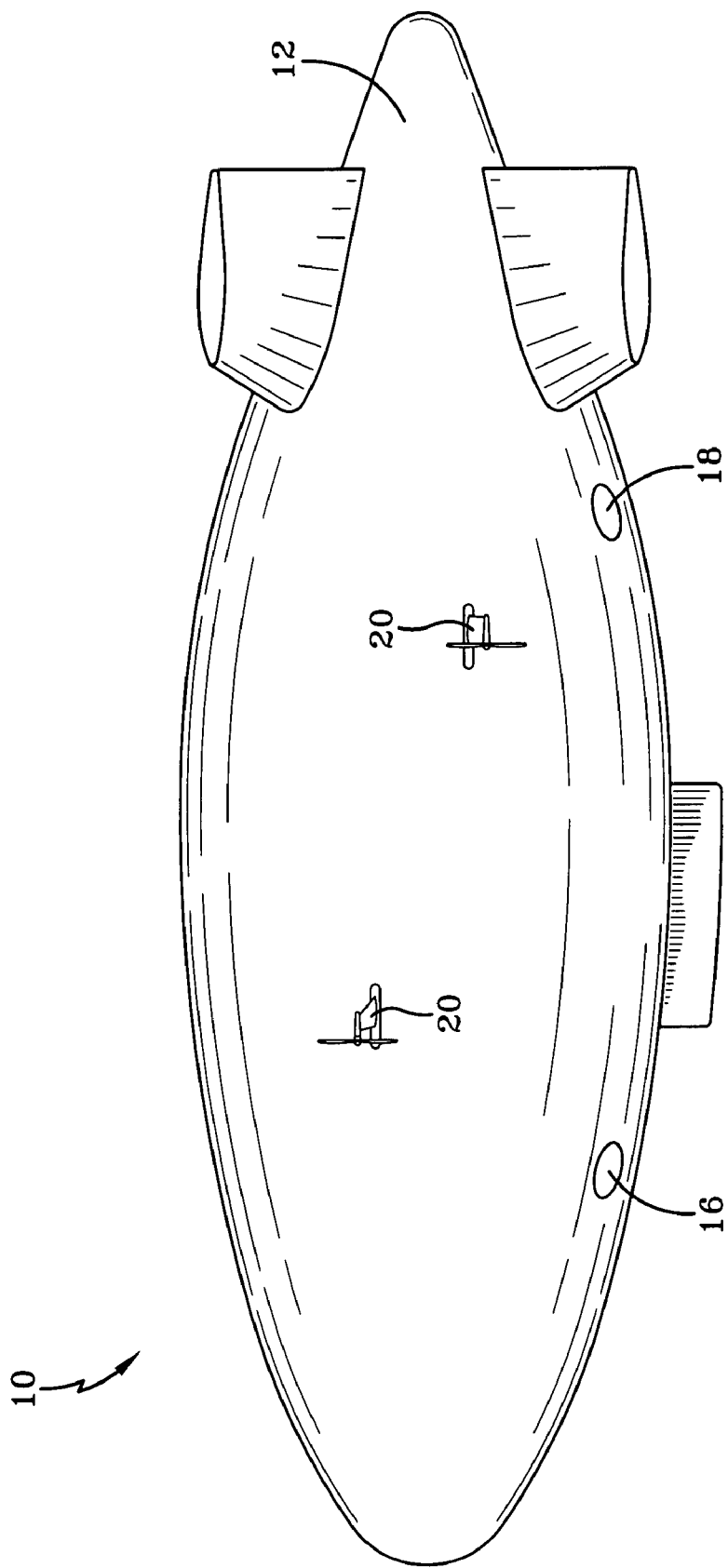
FIG. 1 is an elevational view of a prior art airship showing the various valves, blowers, and propeller units used to control the airship during flight, including descent, according to the concepts of the present invention.
Figure 2:
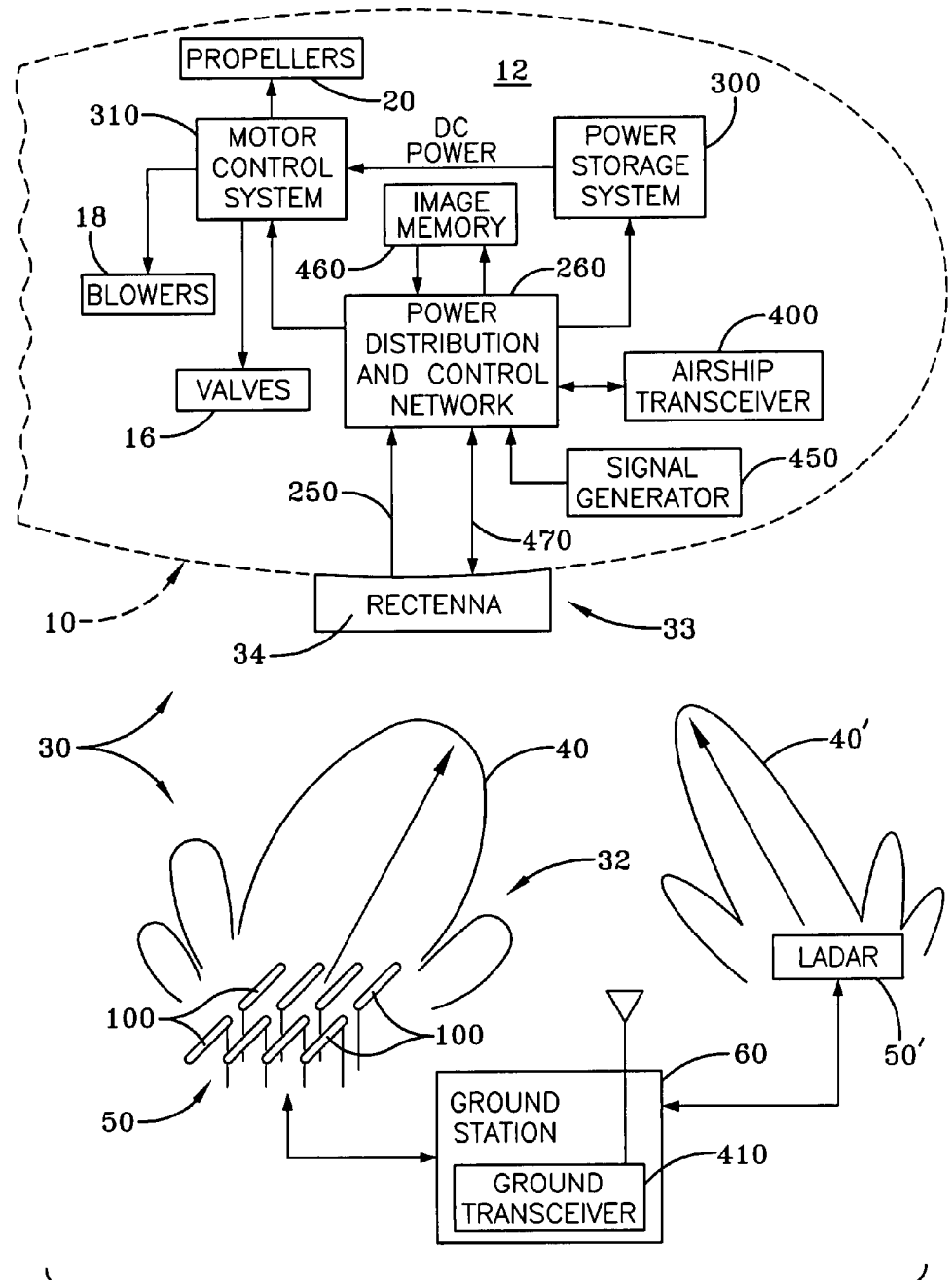
FIG. 2 is a block diagram of an airship maintaining a power reception system, and a ground based power transmission system for transmitting an energy beam to the airship according to the concepts of the present invention.

A power and imaging system is generally referred to by the numeral 30, as shown in FIG. 2 of the drawings. The power and imaging system 30 comprises generally, a power transmission system 32 and a power reception system 33. The power reception system 33 provides a patch rectenna array 34 that is adapted to be carried by an airship 10, such as the one discussed with regard to FIG. 1. Generally, the patch rectenna 34 is configured to receive power distributed in the form of an energy beam 40 that is delivered from a phased array antenna 50 maintained by the power transmission system 32. This transmitted energy beam 40 is then processed by components aboard the airship 10 so as to power the valves 16, the blowers 18, the propeller units 20 and other electrically powered components during various stages of flight, including ascent and descent, for example. Thus, the system 30 allows the airship 10 to reduce the amount of power it consumes from its onboard batteries. As such, the number of batteries required by the airship 10 may be reduced, thus reducing the weight of the airship 10. Although the following discussion relates to supplying power to an airship during descent, such discussion should not be construed as limiting, as the system 30 may be used to power the airship during any phase of flight. Furthermore, before setting forth the details of the system 30 it should be appreciated that the term "airship" as used herein, is defined as any blimp, aerostat, dirigible, lighter-than-air vehicle or platform, high-altitude airship or the like.

The power transmission system 32 includes a ground station 60 that is in electrical communication with the phased array antenna 50, which may comprise a stationary unit positioned on the ground, or may which may be configured as a mobile unit that may be moved or readily relocated via a truck, for example. The ground station 60 includes a computer-based device that maintains the necessary hardware, software, and memory to carry out the functions to be discussed. In order to generate the beam of energy 40, various radio frequency (RF) excitation signals are generated by an oscillator (not shown) maintained by the ground station 60 that are delivered to the phased array antenna 50. The frequency of the RF excitation signals is generally proportional to the frequency of the energy beam 40 that is generated therefrom. As such, the frequency of the excitation signal is selected so that the frequency of the resultant energy beam 40 matches the signal reception bandwidth of the patch rectenna 34. It should be appreciated that the frequency of the RF excitation signals generated by the ground station 60 may be in the microwave spectrum, although excitation signals of any suitable RF frequency may be utilized with the power transmission and imaging system 30.

The phased array antenna 50 comprises a plurality of transmission antenna elements 100 that are individually coupled to, and controlled by, the excitation signals sent from the ground station 60. Additionally, the antenna elements 100 are arranged so that the generated energy beam 40 has a coherent and highly directional energy pattern. The RF excitation signals generated by the ground station 60 used by the phased array antenna 50 to generate the energy beam 40 comprise various parameters, such as amplitude, frequency and phase that may be modified or adjusted at the ground station 60. Moreover, because individual excitation signals may be independently delivered to each of the transmission antenna elements 100 of the phased array antenna 50, the parameters of each of the excitation signals may be individually adjusted so that the generated energy beam 40 takes on various energy patterns, while also allowing for directivity of the transmitted energy beam 40 to be altered. For example, the transmission antenna elements 100 of the phased array antenna 50 may each be driven by excitation signals at a predetermined relative phase, which provides a transmitted energy beam 40 having a narrow radiation pattern, and a power density that is maximized. Alternatively, suitable excitation signals may be generated so that the energy pattern of the energy beam 40 is shaped so as to reduce or eliminate any extraneous or unwanted side lobes that are part of the energy pattern associated with the transmitted energy beam 40. Although a phased array antenna has been contemplated as being used to generate the energy beam 40, it should be appreciated that the phased array antenna 50 may comprise a patch microwave dipole antenna, for example. It is also contemplated that the phased array antenna 50 may be configured to provide a high antenna aperture efficiency and a large radar cross-section, thus allowing the gain and power-aperture product to be increased. In one aspect, the energy beam may utilize a radio frequency (RF) in the microwave spectrum, although any suitable frequency for beaming power via the energy beam 40 may be utilized.

Because the energy beam 40 generated by the phased array antenna 50 is coherent and highly directional, it may be precisely positioned, or pointed, so that it is incident upon the patch rectenna array 34 maintained by the airship 10. In addition to being highly directional, the phased array antenna 50 may be repositioned, or repointed rapidly, with the speed of repainting being determined by the speed with which the phases of the exciting signals delivered to each of the antenna elements 100 by the ground station 60 can be adjusted. To achieve such repainting rapidity, the transmission antenna elements 100 of the phased array antenna 50 may each comprise an agile planar wave antenna, for example.

In addition to modifying the parameters of the excitation signals to alter the energy pattern of the transmitted energy beam 40, other techniques may be used. For example, the energy pattern of the transmitted energy beam 40 may be narrowed, while increasing its power, by incorporating additional transmission antenna elements 100 into the phased array antenna 50. To achieve such performance, the excitation signal provided by the ground station 60 is delivered equally to each of the antenna elements 100. Thus, the excitation signals delivered to each of the antenna elements 100 are of all equal magnitude, and in phase with each other. As a result, the more transmission antenna elements 100 added to the transmission antenna array 50, the further the transmitted energy beam 40 may be narrowed, while also increasing the strength of the energy pattern of the energy beam 40 in the broadside direction. It should be appreciated that the term broadside direction, as used herein, refers to the direction of the main lobe of the energy pattern maintained by the energy beam 40 that is normal to the plane of the phased array antenna elements 100.

In another aspect of the present invention 30, the phased array antenna 50 and associated antenna elements 100 may be replaced with a field LADAR (Laser Detection and Ranging) system 50'. The field LADAR may comprise a carbon dioxide ($CO_2$) laser that enables an energy beam 40' to have an enhanced energy pattern. Additionally, the energy beam 40 produced by the field LADAR system produces an enhanced transmission range and a line-of-sight (LOS) directivity over that provided by the radio frequency (RF) based phased array antenna 50 previously discussed above. It should be appreciated that the field LADAR system provides increased energy efficiency over that of the RF based phased array antenna 50, whereas the phased array antenna 50 provides a wider range of frequencies that can be included in the energy pattern of the energy beam 40. Moreover, the LADAR system provides an increased modulation transfer function that results in image fidelity and contrast to be better preserved. It is also contemplated that in lieu of the LADAR system, that the phased array antenna 50 may be replaced with any efficient, narrow beam, high frequency energy transmission system as well.

In order to capture the power delivered from a transmitted energy beam 40, the airship 10 utilizes the power reception system 33. As such, when the airship 10 in range of the transmitted energy beam 40, the power reception system 33 maintains a constant line of sight with the power transmission system 32, so as to permit continuous, uninterrupted power transmission of the energy beam 40 to the airship 10. The transmitted power allows the valves 16, blowers 18, propeller 20, and any other desired component to be powered upon descent of the airship 10, in a manner to be discussed.

The power reception system 33 is configured as part of the payload of the airship 10, and provides the patch rectenna array 34 that is mounted to the underside of envelope 12, as shown in FIG. 2. During operation, the patch rectenna array 34 converts the AC power carried by the energy beam 40 into DC power that is compatible for use with the various components of the airship 10, such as the valves 16, blowers 18 and propellers 20. It should be appreciated that the rectenna array 34 is configured to provide optimal signal gain, while minimizing losses in the power transmission process.

Figure 3:
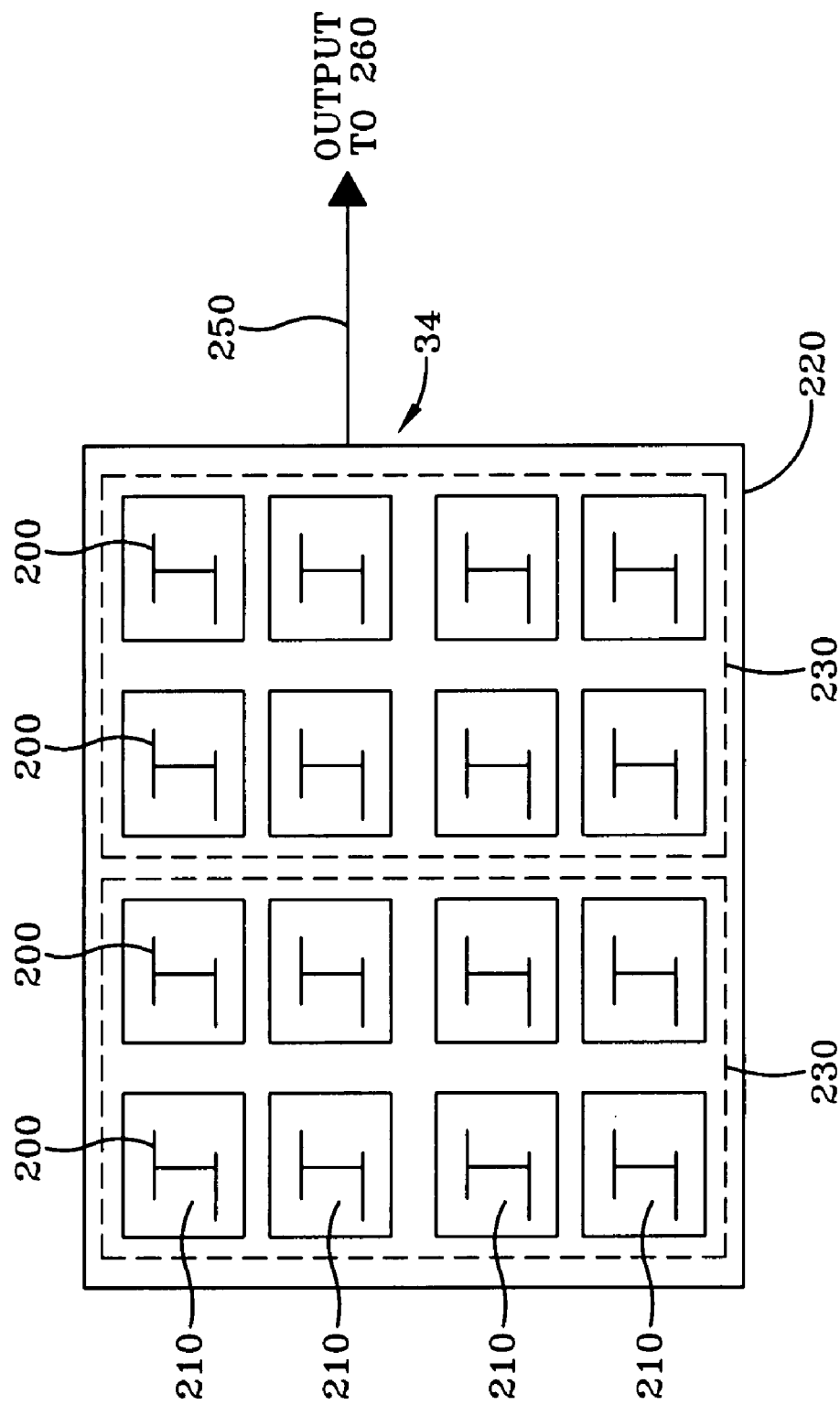
FIG. 3 is a plan view of a patch rectenna array and associated circuitry used for transforming the power delivered by the transmitted energy beam into power used by the airship according to the concepts of the present invention.
Figure 4:
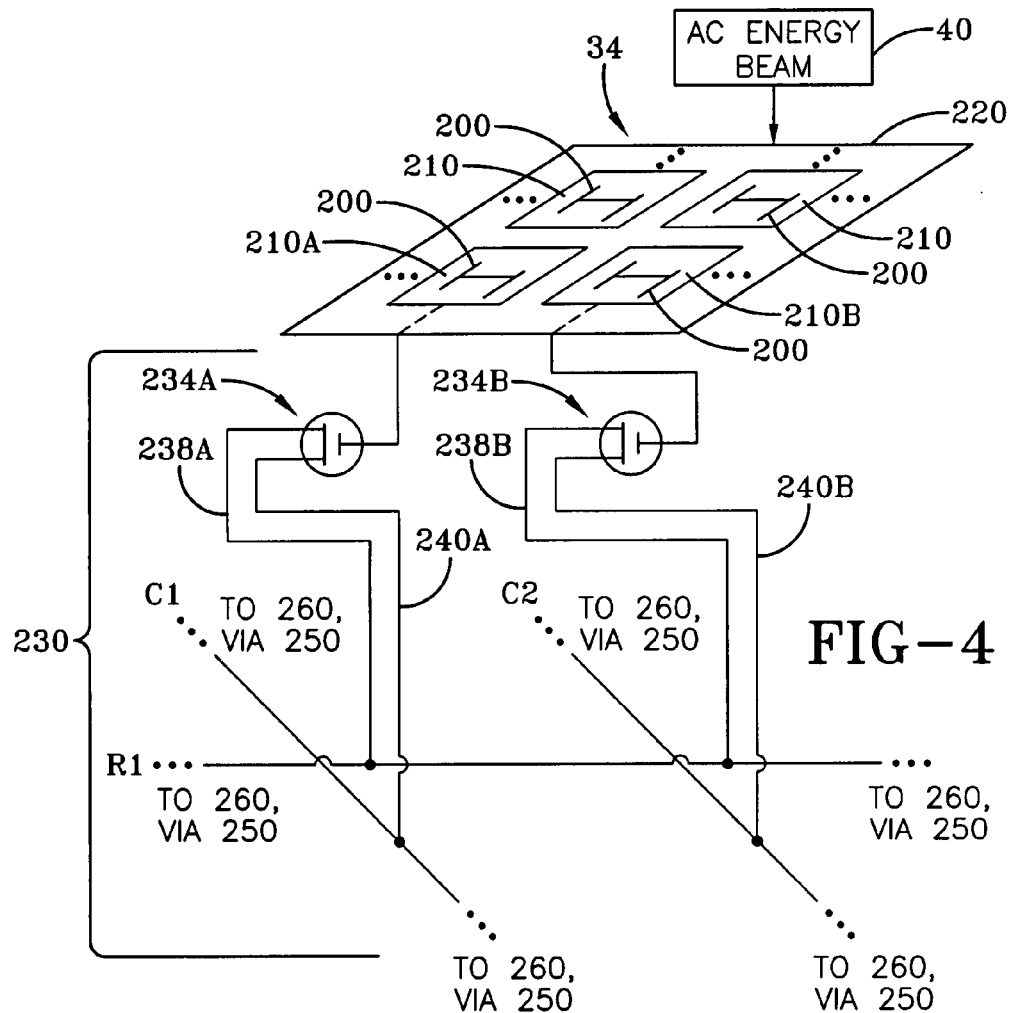
FIG. 4 is a schematic view of the patch rectenna and associated MOSFETS used for harvesting the power carried by the transmitted energy beam according to the concepts of the present invention.
Figure 5:
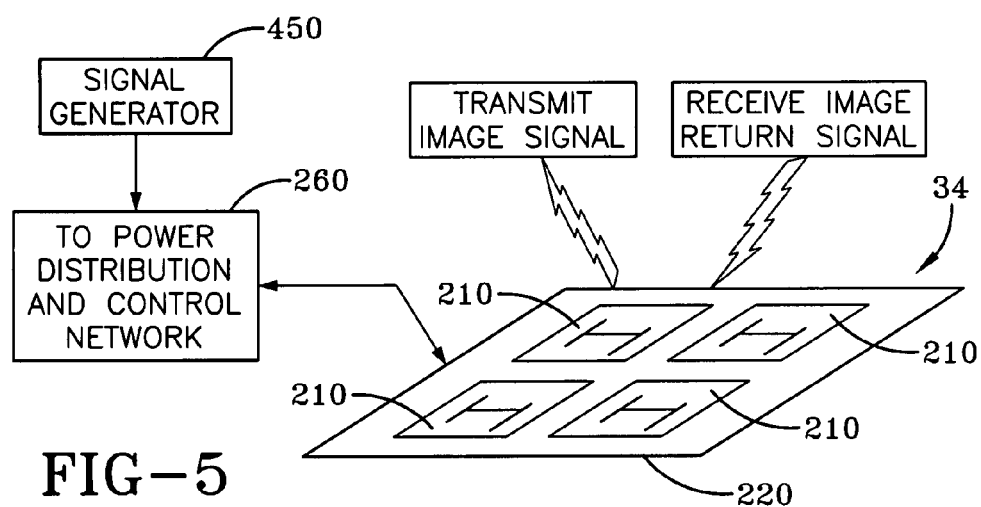
FIG. 5 is a schematic view of the patch rectenna when utilized for aerial imaging according to the concepts of the present invention.

With respect to its design, shown in FIGS. 3 and 4, the patch rectenna array 34 comprises a planar array of dipole antenna elements 200 that are each associated with a corresponding matched filter 210 that are integrated into a membrane structure 220. The membrane 220 comprising the rectenna array 34 may be flexible, and further integrated into the fabric of the envelope 12. As such, the rectenna array 34 may be completely occluded from view by the fabric of the envelope 12 of the airship 20. When such a configuration is used, it should be appreciated that the energy beam 40 should utilize a frequency penetrable through the fabric of the envelope 12 so that the power can be received by the patch rectenna 34 with minimal attenuation. Further, the patch rectenna 34 is configured to have an antenna aperture diameter that is oriented broadside to the energy pattern delivered by the energy beam 40.

The dipole antenna units 200 are dimensioned so as to tune the patch rectenna 34 to achieve the reception bandwidth necessary for receiving the specific frequency of the transmitted energy beam 40. Moreover, the dipole antenna units 200 may comprise nanofibers formed from titanium, as titanium nanofibers provide benefits to the present invention due to their strength, their resistive thermal properties, and electro-magnetic conductivity. However, it is also contemplated that the nanofibers comprising the dipole units 200 may be formed from various other materials, such as carbon, selenium, or any other suitable material. Nanofibers impart flexibility to the patch rectenna 34, thus allowing it to match the rate of expansion and contraction of the envelope 12 as various atmospheric pressure changes are encountered by the airship 10 during ascent and descent. In addition, the use of titanium allows the dipole antenna elements 200 to be highly tolerant of temperature fluctuations, and solar radiation. This is beneficial as the airship 10 is subjected to varying temperature levels and radiation intensities that vary widely with altitude.

Coupled to the output of each individual nanofiber dipole antenna element 200, is the matched filter 210. The matched filters 210, are typically lightweight, and are configured to maximize the peak-signal-to-mean-noise ratio of the power delivered by the transmitted energy beam 40 via each of the dipole antenna units 200. Additionally, the signal bandwidth of the matched filter 210 is configured to be matched with that of the frequency of the transmitted energy beam 40, allowing the matched filter 210 to minimize the losses that result in the reception of the received power carried thereby. Such a configuration allows the highest amount of power to be delivered to the airship 10 with enhanced efficiency. In addition, the matched filter 210, utilizes known signal processing techniques to maximize the power received by the rectenna array 34 of the airship 10. While the discussion presented above recites the use of individual matched filters 210 for each dipole antenna element 200, the matched filter 210 may be configured as a single filter that receives a portion of the received energy beam from each of the individual rectenna elements 210 in aggregate.

In order to convert the alternating current (AC) signal output by each of the matched filters 210 into direct current (DC) power, a power rectification network 230 is utilized. The power rectification network 230 is composed of a grid or array of electrical conductors that form a number of rows R1, R2, and so on, and columns C1, C2, and so on, which supply rectified power to the airship 10 in a manner to be discussed. Specifically, each matched filter 210 maintained by the patch rectenna 34 is coupled via the various rows R and columns C to respective dual N-channel MOSFETs 234A and 234B. Although FIG. 4 only shows the connection of two MOSFETS to two matched filters 210, designated A-B, it should be appreciated that each matched filter 210 maintained by the patch rectenna 34 may have an associated dual channel MOSFET, that is coupled to the power rectification network 230 in the manner described herein. Furthermore, it should be appreciated that additional rows and columns may be added to the power rectification network 230 as needed, so that additional MOSFETS can be accommodated in order to adjust the amount of power harvesting that the rectenna 34 is able to provide. In one aspect, the MOSFETs 234A and 234B may comprise an ambient dual N-channel MOSFET such as that provided under the trademark HEXFET® having part number IRF7313UPbF.

Specifically, the dual N-channel MOSFETs 234A and 234B are configured such that their first drain terminals 238A, 238B are coupled to the same row R1, and their second drain terminals 240A,240B are coupled to respective columns C1 and C2 of the power rectification network 230. As such, the dual-channel MOSFETs 234A and 234B serve as power harvesters and supply DC power to the power rectification network 230. In addition, the dual N-channel MOSFET 234A, 234B provides two current paths to their particular nodal attachment points to row R1 and columns C1,C2 of the rectification network 230. Thus, if one MOSFET connection to the rectification network 230 is broken, the other MOSFET still is able to provide power to the rectification network 230. Moreover, each MOSFET 234A,234B may be controlled through various address control logic maintained by a power distribution and control network 260 that is interfaced with the power rectification network 230 so that each MOSFET 234A,234B may be independently turned on or off as needed to scale the amount of power output therefrom. It is also contemplated that the circuitry comprising the power rectification network 230 may also be integrated directly into the membrane 220, or may be comprised as a separate discrete unit.

Continuing, the power rectification network 230 is coupled via a power interface 250 to a power distribution and control network 260, shown in FIG. 2, that is maintained aboard the airship 10. While the power rectification network 230 performs the DC rectification of the analog or AC power delivered by the transmitted energy beam 40, the power distribution and control network 260 performs additional power conditioning functions, so that the received power is transformed into a format compatible with the various electrical components of the power reception system 33 that are to be discussed.

The output of the power distribution and control network 260 is delivered to a power storage system 300 and to a motor control system 310. The power storage system 300 comprises a plurality of batteries that are charged by a portion of the power delivered by the received energy beam 40. In addition, the power storage system 300 is coupled to the motor control system 310 so that the stored power may be used when the airship 10 is out of the range of the phased array antenna 50, or if the energy beam 40 is otherwise unavailable. The motor control system 310 receives and processes the power delivered by either the power distribution and control network 260 or the power storage system 300, and generates suitable control signals that are compatible for the actuation of the valves 16, blowers 18, and propellers 20 maintained by the airship 10. Thus, when the airship 10 is in the range to receive the transmitted energy beam 40, the power used to actuate the valves 16, blowers 18, and propellers 20 is provided directly from the energy beam 40 via the power distribution and control network 260. Alternatively, when the airship 10 is not in range to receive the transmitted energy beam 40, or if the energy beam 40 is otherwise unavailable, the power used to actuate the valves 16, blowers 18, and propellers 20 is provided from the stored energy provided by the power storage system 300. In order to control the amount of power that is delivered to the airship 10 during a descent, a closed-loop control system comprising an airship transceiver 400 coupled to the power distribution and control network 260 and a ground station transceiver 410 maintained by the ground station 60 may be utilized, so as to control the level of power transmitted via the energy beam 40 or 40', as well as other features, which will be discussed below.

Now that the structural components utilized by the power transmission and imaging system 30 have been set forth in detail above, the following discussion will present the operational steps taken by the system 30 in delivering power to the airship 10 during descent. Initially, to descend the airship 10 from altitude it is brought into the range of the energy beam. Somewhat simultaneously, the ground station 60 generates RF excitation signals that are individually delivered to each of the transmission antenna elements 100 of the phased array antenna 50 or the LADAR 50'. Upon receipt of the RF excitation signals, the phased array antenna 50 or the LADAR 50' generates the appropriate energy beam 40, which is pointed or directed toward the patch rectenna 34 carried by the airship 10. The pointing angle at which the energy beam 40 is oriented with regard to the airship 10, may be changed by adjusting the phase and other parameters of the excitation signals delivered to the particular transmission antenna elements 100 of the phased array antenna 50 or the LADAR 50'. For example, if all of the transmission antenna elements 100 receive excitation signals that are in-phase, the transmitted energy beam 40 or 40' will provide an energy pattern having its main lobe oriented broadside to the transmission antenna array 50.

Once the energy beam 40 or 40' has been transmitted, it is received by the dipole antenna element 200 of the patch rectenna 34. After being received by the patch rectenna 34, the analog or AC (alternating current) power delivered by the energy beam 40 is filtered by the matched filter 210 and then rectified by the power rectification network 230 to provide DC (direct current) power. The rectified DC power is then delivered, via the interface 250 to the power distribution control network 260, where it is processed into a compatible format for use by the power storage system 300 and the motor control system 310.

Specifically, the power delivered to the power storage system 300 is stored into one or more batteries, which are used to supply power to the motor control system 310 when the energy beam 40 is unavailable to power the airship 10. In addition, the power delivered to the motor control system 310 is processed into suitable propeller control signals, blower control signals, and valve control signals having compatible formats to actuate the associated propellers 20, blower 18, and valve 16, so as to allow the airship 10 to descend in a controlled manner. Thus, when the energy beam 40 is received by the patch rectenna 34, the motor control system 310 is driven by the power delivered by the energy beam 40. However, when the energy beam 40 is unavailable, the motor control system 310 is powered by the batteries of the power storage system 300. Furthermore, it is contemplated that the motor control system 310 may be powered by a combination of power supplied by the power storage system 300 and the power distribution and control system 310.

To control the amount of power delivered to in the energy beam 40 during descent of the airship 10, the power distribution and control network 260 may be programmed with predetermined criteria for determining the rate at which the airship 10 is to descend. Based upon the predetermined criteria, the control network 260 generates a power control signal that is transmitted by the airship transceiver 400, for receipt by the ground station 60 via the ground transceiver 410. The power control signal contains data regarding the change in power delivered by the energy beam 40 so that a descent based upon the predetermined criteria is achieved.

For example, if the power distribution and control network 260 determines that the available voltage level needed to operate the propellers 20 is insufficient, the airship 10 may transmit a power control signal that indicates the power contained in the energy beam 40 should be increased. In response, the ground station 60 adjusts one or more of the parameters associated with the excitation signals, such that the resultant beam 40 has an increased power profile, thus allowing the airship 10 to increase the speed of the propellers 20.

In order to maintain optimal alignment of the energy beam 40 with the patch rectenna 34 during transmission of the energy beam 40, and to minimize potential losses of energy during the energy transmission process, a closed loop control system comprising the airship transceiver 400 and the ground station transceiver 410 may be utilized. Thus, during descent of the airship 10, simultaneously with the receipt of the energy beam 40, the power distribution control network 260 generates a realignment feedback signal that is continuously transmitted to the ground station 60 via the airship transceiver 400. The realignment feedback signal contains data regarding the orientation of the energy pattern of the energy beam 40 with respect to the surface of the patch rectenna 34. Specifically, the power distribution control system 260 maintained by the airship 10 may be programmed with a voltage threshold value and other criteria that corresponds to the maximum drift the energy beam 40 is permitted from the center of the antenna aperture of the patch rectenna 34. As such it is contemplated that the control system 260 may repeatedly interrogate the output voltage of the patch rectenna 34 at a predetermined frequency to determine if it is above or below the preprogrammed threshold value. If the power distribution control network 260 determines that the voltage is above the threshold voltage, the power distribution and control system 260 does not generate the realignment signal, and the energy beam 40 is not repointed. However, if the voltage output by the patch rectenna 34 drops below the preprogrammed threshold voltage, then the power distribution and control system 260 generates the realignment signal, which is received by the ground station 60 via the ground transceiver 410. The ground station 60 analyzes the realignment signal and determines the amount of correction needed to repoint the energy beam 40 so that the energy pattern delivered thereby is properly aligned with regard to the antenna aperture of the rectenna array 34. It should be appreciated that maintaining proper alignment between the energy pattern of the transmitted energy beam 40 and the antenna aperture of the patch rectenna 34 provides optimum power delivery to the airship 10.

While the previous discussion sets forth the various components utilized by the power transmission and reception aspects of the present invention, it should also be appreciated that the system 30 may also enable the airship 10 to perform various imaging functions. To enable such imaging functions a signal generator 450 and an image memory 460 may be coupled to the power distribution and control network 260. It should be appreciated that the image memory 460 may also include a processor, that may provide real-time imaging processing. It should be appreciated that the imaging signal may comprise a radio frequency (RF) signal, such as a radar signal. For example, during operation of the imaging system, the signal generator 450 is configured to deliver an imaging signal having a frequency determined by the control network 260. The imaging signal is then delivered to the power distribution and control network 260, where the imaging signal is emitted by the patch rectenna array 34. Once the imaging signal has been emitted or otherwise transmitted by the patch rectenna array 34, the signal generator 450 is turned off by the control network 260, so that any image return signals or echoes that form return images, may be received by the patch rectenna array 34. The return signals detected by the rectenna array 34 are digitized via an analog-to-digital conversion performed by the power distribution and control network 260. The digitized data is then stored and/or processed at the image memory 460 for the subsequent transfer to the ground station 60 where the digital image data can be reconstructed. In one aspect the digital image data may be reconstructed using synthetic aperture radar (SAR) imagery techniques for example.

Thus, during flight of the airship 10, the signal generator 450 generates suitable image signals that are emitted by the patch rectenna 34. Reflected return signals are then received via the patch rectenna 34 where they are digitized by the control network 260 so as to generate a radar image of the terrain or other object of interest beneath the airship 10. The images received by the airship 10 may also be transmitted to the ground station 60 or other designated location for further analysis. It should also be appreciated that the imaging system may also use synthetic aperture radar for example. Furthermore, it is also contemplated that the imaging functions and the power harvesting functions of the system 30 may be used simultaneously.

It will, therefore, be appreciated that one advantage of one or more embodiments of the present invention is that a power and imaging system for an airship reduces the number of batteries needed to power the airship. Another advantage of the present invention is that titanium nanofibers can be utilized to form the patch rectenna. Still another advantage of the present invention is that a power and imaging system for an airship utilizes a matched filter to optimize the amount of power captured from a transmitted energy beam. Yet another advantage of the present invention is that a field LADAR system may be utilized to transmit an energy beam to the airship. Finally, another advantage of the present invention is that a dual-use power and imaging system for an airship provides an imaging system that shares the same components of the power transmission and reception system.

Although the present invention has been described in considerable detail with reference to certain embodiments, other embodiments are possible. Therefore, the spirit and scope of the appended claims should not be limited to the description of the embodiments contained herein.

What is claimed is:

1. A power and imaging system for an airship, the system comprising:
   an airship;
   a power transmission system configured to transmit an energy beam;
   a patch rectenna carried by said airship, wherein said energy beam is transmitted to said patch rectenna so as to supply power to said airship;
   a power distribution and control network coupled to said patch rectenna such that when said energy beam is transmitted to said patch rectenna, said control network converts said energy beam into power for use by said airship; and
   a signal generator coupled to said power distribution and control network, wherein said signal generator and said control network is configured to generate imaging signals that are transmitted by said patch rectenna for a period of time, wherein any of said imaging signals returning to said patch rectenna are detected by said patch rectenna as image return signals when said signal generator is turned off.

2. The power transmission and imaging system of claim 1, further comprising:
an airship transceiver coupled to said power distribution and control network, said airship transceiver generating a realignment feedback signal when the power received from said energy beam by said patch rectenna falls below a predetermined voltage threshold; and
a ground transceiver coupled to said power transmission system configured to repoint the position of said transmitted energy beam on said patch rectenna in response to the receipt of said realignment feedback signal from said ground transceiver.

3. The power transmission and imaging system of claim 1, wherein said power transmission system comprises a field laser detection and ranging (LADAR) system.

4. The power transmission and imaging system of claim 1, wherein said power transmission system comprises a phased array antenna system that includes a plurality of transmission antenna elements.

5. The power transmission and imaging system of claim 4, wherein said transmission antenna elements comprise a plurality of planar wave antenna elements.

6. The power transmission and imaging system of claim 4, wherein each said transmission antenna element is configured to receive individual excitation signals.

7. The power transmission and imaging system of claim 6, wherein said excitation signals are in phase with each other, such that a main lobe of said energy beam is directed to said phased array antenna.

8. The power transmission and imaging system of claim 1, further comprising:
an image memory coupled to said power distribution and control network, said image memory configured to store said image return signals.

9. The power transmission and imaging system of claim 8, wherein said power distribution and control network performs an analog to digital conversion of said image return signals stored at said image memory.

10. The power transmission and imaging system of claim 1, wherein said airship has an envelope formed from a flexible fabric, and wherein said patch rectenna is flexible and integrated into said fabric.

11. The power transmission and imaging system of claim 10, wherein said patch rectenna comprises a plurality of dipole antenna elements.

12. The power transmission and imaging system of claim 11, wherein said dipole antenna elements are comprised of nanofibers.

13. The power transmission and imaging system of claim 12, wherein said nanofibers are comprised of titanium.

14. The power transmission and imaging system of claim 11, further comprising:
a matched filter coupled between said dipole antenna elements and said power distribution and control network.

15. The power transmission and imaging system of claim 14, further comprising:
a power rectification network coupled between said matched filter and said power distribution and control network.

16. The power transmission and imaging system of claim 15, wherein said power rectification network comprises one or more MOSFETS.

17. The power transmission and imaging system of claim 15, wherein said matched filter and said power rectification network are integrated within said membrane.

18. The power transmission and imaging system of claim 17, wherein said envelope contains a lifting gas.

* * * * *